United States Patent
Uchida et al.

[15] 3,661,441
[45] May 9, 1972

[54] ARRANGEMENT FOR ACOUSTO-OPTICAL LIGHT DEFLECTION

[72] Inventors: Naoya Uchida, Tokyo; Yoshiro Ohmachi, Tokorozawa; Nobukazu Niizeki, Tokyo; Takahiro Inamura, Yamato, all of Japan

[73] Assignee: Nippon Telegraph and Telephone Public Corporation, Tokyo, Japan

[22] Filed: Oct. 27, 1970

[21] Appl. No.: 84,450

[30] Foreign Application Priority Data

Nov. 21, 1969 Japan..............................44/92913
Nov. 21, 1969 Japan..............................44/92916
Nov. 24, 1969 Japan..............................44/94062
Nov. 24, 1969 Japan..............................44/94063
Nov. 24, 1969 Japan..............................44/94064
Nov. 24, 1969 Japan..............................44/94065
Nov. 24, 1969 Japan..............................44/94066
Nov. 24, 1969 Japan..............................44/94067

[52] U.S. Cl..................350/149, 250/199, 350/150, 350/161
[51] Int. Cl.......................................................G02f 1/24
[58] Field of Search..........350/147, 149, 150, 157, 160–161; 250/199

[56] References Cited

OTHER PUBLICATIONS

Uchida et al., " Elastic and Photoelastic Properties of Tellurium Dioxide Single Crystal," J. App. Phys. Vol. 40 No. 12 (Nov. 1969) pp. 4692– 4695.

*Primary Examiner*—David Schonberg
*Assistant Examiner*—Paul R. Miller
*Attorney*—Flynn & Frishauf

[57] ABSTRACT

There has been disclosed a novel use of single crystal paratellurite, that is, tellurium dioxide $TeO_2$ as a medium for acousto-optical light deflection. The light deflecting medium of the present invention enables light and ultrasonic waves passing therethrough to interact with each other with a higher efficiency than that of the prior art. The present light deflecting medium displays various effects by the several combinations of the propagation directions of light and acoustic waves.

24 Claims, 3 Drawing Figures

ARRANGEMENT FOR ACOUSTO-OPTICAL LIGHT DEFLECTION

This invention relates to an optical beam deflecting system, and more particularly to arrangements for acousto-optical light deflection by conducting light beams and ultrasonic waves through a single crystal deflecting element.

There has heretofore been widely adopted a mechanical deflector which consists in causing a prism or mirror to be mechanically vibrated or rotated, thereby deflecting incident optical beams spatially. However, such type of deflector had the drawbacks that since it included mechanically movable parts, long use resulted in the reduced stability and reliability of deflection, and further the deflected spot could not be allowed to travel at an appreciably accelerated speed.

In substitution, there have in recent years been proposed various deflectors using an electro-optical effect or acousto-optical effect based on ultrasonic waves. Particularly, the latter process comprises an optical medium permeable to the light used, on the surface of which there is evaporated an electromechanical transducer, or two media of simple construction at most having a transducer bonded thereto, whereby light beams can be deflected in two dimensions. Accordingly, the latter process offers economic advantage and is also capable of rendering the device compact. However, this type of deflector is still encountered with a problem in the selection of a material to be used as an optical medium.

An optical medium for acousto-optical light deflection utilizing the interacting phenomenon of light beams and ultrasonic waves should meet two most important requirements:
1. The later described acousto-optical figures of merit M and M' indicate large values; and
2. The acoustic attenuation coefficient is small.

Further to accelerate the travelling speed of a deflected light beam spot, it is desired that there be obtained a rapid acoustic phase-velocity perpendicular to the acoustic wave front.

The aforementioned acousto-optical figures of merit M and M' are defined by the following equations:

$$M = n^6 p^2 / \rho v^3 \quad (1)$$
$$M' = n^7 p^2 / \rho v \quad (2)$$

where:
$n$ is the refractive index of an optical medium;
$p$ is its photoelastic constant;
$\rho$ is its density; and
$v$ is the aforementioned acoustic phase-velocity.

M is a guide for indicating the intensity of deflected light beams with respect to ultrasonic waves having a certain frequency, that is, the degree of deflecting efficiency. M' is a guide for said deflecting efficient where there is taken into consideration a tolerance of deviation from Bragg's condition indicated by the following equation when ultrasonic waves are varied in frequency while the incident angle is fixed which is defined by light beams with ultrasonic waves $$\sin \theta = \lambda / 2\Lambda$$

where:
$\theta$ is an angle defined by an incident light with an acoustic wave front;
$\Lambda$ is the wavelength of acoustic waves; and
$\lambda$ is the wavelength of light beams.

When there is prepared a light deflecting medium for practical application, it is necessary to select the material of said medium in due consideration of the ratios of M and M' in accordance with the standards demanded of said element.

Solid deflecting media generally give good deflection stability in long duration of use and are little subject to acoustic loss, so that they are practically more adapted than liquid or gas types. Known materials used as a solid light deflecting medium include lithium metaniobate ($LiNbO_3$), α-iodic acid (α-$HIO_3$), lead molybdate ($PbMoO_4$) and thallium iodo-bromide (TlIBr) used in a visible region. However, $LiNbO_3$ gives small values of M and M'; α-$HIO_3$ is unadapted for use due to its high water-solubility; $PbMoO_4$ crystallographically tends toward cleavage and is unsuitable for optical application; and TlIBr fails to be put to practical use due to its low transparency for visible light beams. Other known solid deflecting media only usable in the infrared region are metallic tellurium (Te) and gallium arsenide (GaAs). However, these substances have the drawbacks that Te indicates a low permeability to infrared rays, while GaAs presents difficulties in obtaining a large single crystal having good optical properties.

An object of the present invention is to provide a solid medium suitable for acousto-optical light deflection over a wide wavelength range of from visible to infrared rays.

Another object of the invention is to provide a solid light deflecting medium having large values of M and M' and other excellent physical properties.

Still another object of the invention is to provide a solid light deflecting medium displaying various effects by allowing light beams and ultrasonic waves to pass therethrough in different directions respectively.

These objects may be attained in accordance with the present invention using single crystal paratellurite, that is, tellurium dioxide ($TeO_2$).

Use of this single crystal paratellurite as a light deflecting medium has prominently elevated the stability, reliability and in consequence efficiency of light deflection, and further noticeably reduced the capacity of an input power source and the manufacturing cost of an apparatus including said medium.

Other important objects and advantageous features of the present invention will be apparent from the following description and accompanying drawings; wherein, for present purposes of illustration only, specific embodiments are set forth in detail.

Figure 1:
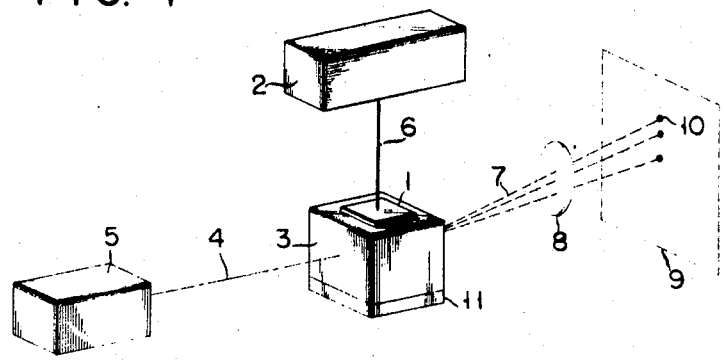
FIG. 1 is an explanatory perspective view of an arrangement for one-dimensional acousto-optical light deflection where there is used only one unit of single crystal paratellurite.

There will now be described by reference to FIG. 1 the general arrangement and principle of an acousto-optical light deflector according to the present invention. When there are transmitted ultrasonic waves generated by a transducer 1 connected to a microwave source 2 in a range from VHF to UHF through a solid medium in an appropriate direction, then there occur small variations of the refractive index in the medium, resulting in the grating of said refractive index. When light beams 4 from a light source 5 are incident upon the solid medium 3 at a specific angle with respect to said grating, part or all of said light beams transmitted through the said medium 3 are deflected at a certain angle to their incidence. This deflection angle of light beams is in substantially inverse proportion to the acoustic wavelength passing through the medium 3. Accordingly, variation of the frequency of input signals 6 supplied to the transducer from the microwave source 2 and in consequence the acoustic frequency enables the spatial location of deflected light beams 7 to be changed as desired. Passage of the deflected light beams 7 through optical means 8 such as lens results in the focusing of an optical spot 10 on an object plane 9. In the aforementioned type of light deflector, it is customary practice to provide an acoustic absorber 11 at the back of the input signal face of the deflecting medium 3 in order to make the progressive acoustic waves introduce into said medium 3 instead of the standing wave.

The present invention is characterized in that the deflecting medium 3 consists of a single crystal of rutile-type tellurium dioxide (hereinafter abbreviated as $TeO_2$), that is, the so-called "paratellurite." This single crystal is generally obtained by the pulling method, which generally enables a good quality single crystal to be formed in a larger volume than a minimum size of 10 × 10 × 10 mm required for a deflecting medium. The single crystal paratellurite is optically of extremely good quality, allowing substantially all light beams having a wavelength of from 0.35 to 5 μm to be transmitted therethrough. The crystal belongs to a tetragonal system, wherein $p$, $\rho$, and $v$ in the equations (1) and (2) present different values depending on the orientation of said crystal. Accordingly, various combinations of the travelling direction of ultrasonic waves and the polarization direction of light beams permit figures of merit M and M' to assume different values, some of such combinations being presented in Table 1 below. For comparison, Table 2 gives only one combination of the traveling direction of ultrasonic waves and the polarization direction of light beams with respect to the single crystals of the known deflecting media: $LiNbO_3$, $\alpha$-$HIO_3$, $PbMoO_4$, Te, and GaAs respectively. Throughout both tables, the longitudinal and shear (or transverse) waves as the mode of acoustic waves are represented by the characters L and S respectively. The values of M and M' denote those obtained with optical waves having a wavelength of 6,328 A.

TABLE 1. *Experimental results using $TeO_2$ element*

| | Acoustic wave | | | |
|---|---|---|---|---|
| Mode | Propagating direction | Displacement direction | Velocity $v$ ($\times 10^5$ cm/sec) | Attenuation (dB/cm) |
| L | [001] | | 4.26 | 2.5 (at 500 MHz) |
| L | [001] | | 4.26 | 2.5 (at 500 MHz) |
| L | [101] | | 3.64 | |
| L | [100] | | 2.98 | 1.5 (at 200 MHz) |
| S | [110] | [$\bar{1}$10] | 0.617 | 6 (at 100 MHz) |
| S | [101] | [$\bar{1}$01] | 2.08 | |
| S | [1.38, 1, 0], [1, 1.38, 0], [$\overline{1.38}$, 1, 0], or [$\bar{1}$, 1.38, 0] in (001) | | 0.93 | 5 (at 100 MHz) |

| | Optical wave | | Figures of merit | | Useful optical wavelength region (μm) |
|---|---|---|---|---|---|
| Mode | Propagating direction | Polarized direction | M ($\times 10^{18}$ sec$^3$/g) | M' ($\times 10^{-7}$ cm$^2$ sec/g) | |
| L | in (001) | ⊥ [001] | 34.5 | 142 | 0.35 to 5 |
| L | in (001) | [001] | 25.6 | 113 | 0.35 to 5 |
| L | [$\bar{1}$01] | [010] | 33.4 | 101 | 0.35 to 5 |
| L | [0$\bar{1}$1] | [011] | 20.4 | 42.6 | 0.35 to 5 |
| S | [001] | Arbitrary | 793 | 68.6 | 0.35 to 5 |
| S | [010] | [100] | 77.7 | 76.4 | 0.35 to 5 |
| S | [001] | Arbitrary | 210 | 41 | 0.35 to 5 |

TABLE 2. *Experimental results using other elements*

| | Acoustic wave | | | |
|---|---|---|---|---|
| Single crystal and mode | Propagating direction | Displacement direction | Velocity $v$ ($\times 10^5$ cm/sec) | Attenuation (dB/cm) |
| $LiNbO_3$ L | [11$\bar{2}$0] | | 6.57 | 0.15 (1 GHz) |
| $\alpha$-$HIO_3$ L | [001] | | 2.44 | 2.5 (500 MHz) |
| $PbMoO_4$ L | [001] | | 3.75 | 2.7 (500 MHz) |
| Te L | [11$\bar{2}$0] | | 2.20 | |
| GaAs L | [110] | | 5.15 | 1.8 (200 MHz) |

| | Optical wave | | Figures of merit | | Useful optical wavelength region (μm) |
|---|---|---|---|---|---|
| Single crystal and mode | Propagating direction | Polarized direction | M ($\times 10^{18}$ sec$^3$/g) | M' ($\times 10^{-7}$ cm$^2$ sec/g) | |
| $LiNbO_3$ L | [0001] | [11$\bar{2}$0] | 7.0 | 66.5 | 0.5 to 4.5 |
| $\alpha$-$HIO_3$ L | [010] | [100] | 86 | 103 | 0.4 to 1.3 |
| $PbMoO_4$ L | in (001) | [001] | 37 | 124 | 0.4 to 5.5 |
| Te L | [0001] | [11$\bar{2}$0] | 4400 | 10200 | 3.5 to more than 10 |
| GaAs L | [110] in (110) | [110] | 104 | 925 | 1 to more than 15 |

Table 1 shows that the L-mode acoustic waves propagated along the [001] direction of single crystal paratellurite ($TeO_2$) used as a light deflecting medium indicate appreciably large values of M and M', and are subject to very little transmission loss, thus permitting application of ultrasonic waves of high frequency. Accordingly, the aforementioned L-mode acoustic wave assumes a very great importance for a large capacity deflecting medium, and has further advantage of travelling at an accelerated speed due to its rapid acoustic velocity. In contrast, the S-mode acoustic wave conducted along the [110] direction and displaced to the [$\bar{1}$10] direction has a very slow acoustic velocity, presenting an extremely large value of M. Since, as shown in Table 1, $v$ has a value of $0.617 \times 10^5$ cm/sec and M has a value of $793 \times 10^{-18}$ sec$^3$/g, the aforesaid S-mode acoustic wave permits the preparation of a highly efficient deflecting medium, though said wave does not travel very rapidly. In addition, the L-mode acoustic waves conducted along the [101] and [100] directions and the S-mode acoustic wave carried along the [101] direction also display a fairly good deflecting efficiency.

Where the traveling direction of ultrasonic waves deviates from the [110] direction, the value of M sharply decreases. For example, if, in case the S-mode acoustic wave is propagated along the [110] direction and is displaced to the [$\bar{1}$10] direction the traveling direction of said wave should deviate ±5 degrees in the (001) plane, then the value of M would be drastically decreased to about 400 from 793 as shown in Table 1. Even when the value of M may be reduced to such extent, a value of 400 is still deemed as exceedingly large, so that the aforementioned S-mode acoustic wave can be expected to carry out a fully efficient light deflection. What calls for attention in this case is that said S-mode supersonic wave is not an exactly pure mode, resulting in disagreement between the travelling direction of energy and a direction perpendicular to the supersonic wave front, thus demanding a great deal of consideration to be taken in design. Since, however, this does not raise any substantial technical problem in connection with light deflection, the above-mentioned S-mode acoustic wave is well permitted to be used with a light deflecting medium.

We have further discovered that the S-mode acoustic wave conducted along any of the directions [1.38, 1, 0], [1, 1.38, 0], [$\bar{1}$, 1.38, 0], and [$\overline{1.38}$, 1, 0] of the aforesaid single crystal paratellurite ($TeO_2$) medium has a zero temperature coefficient of acoustic velocity. Where there occurs change of acoustic velocity in a light deflecting medium, light beams are generally deflected in different directions from those predetermined. This event sometimes seriously obstructs the function of a light deflector. Where, therefore, the deflector to be used consists of a medium having a large temperature coefficient of acoustic velocity, it is required that such deflector be treated at a fixed temperature in a thermostat. However, the aforementioned S-mode acoustic wave conducted through the paratellurite medium of the present invention eliminates the necessity of subjecting said paratellurite medium to any such treatment. The value of M indicated by said S-mode acoustic wave stands at 210 as shown in Table 1, a far smaller value than the M value of 793 obtained with another S-mode acoustic wave conducted along the [110] direction. Still, the above-mentioned value of 210 is much larger than those presented by other modes of acoustic waves.

Where the travelling direction of acoustic waves deviates from the [1.38, 1, 0] direction in the (001) plane, the temperature coefficient of acoustic velocity of said waves indicates somewhat large variations. However, when the aforesaid deviation from said [1.38, 1, 0] direction falls within a small range of, for example, less than ±2.5 degrees, then change of the temperature coefficient is limited to less than ±50 ppm. In case said deviation ranges within ±5 degrees, then change of the temperature coefficient stands at less than ±100 ppm. Therefore, if said deviation is as small as described above, a light deflecting medium will be able fully to exhibit its function, depending on the requirements demanded of said medium.

The aforementioned medium used as a light deflector utilizes the so-called normal Bragg reflection phenomenon. However, a deflecting medium using the so-called abnormal Bragg reflection does not generally display an appreciably high deflecting efficiency. However, such deflecting medium has the advantage of obtaining a large number of deflected spots. Accordingly, use of said abnormal Bragg reflection phenomenon will be considered hopeful in the future. From the symmetricity of $TeO_2$ crystal, it is seen that said crystal has an appreciably large value of the photoelastic constant $P_{44}$ closely associated with said abnormal Bragg reflection. We have found that the $TeO_2$ crystal has a $P_{44}$ value of about 0.17. For reference, there are given below the values of the photoelastic constant of other crystals associated with said abnormal Bragg reflection:

$\alpha$- $Al_2O_3$ (sapphire)    $P_{44} = 0.085$  
$LiTaO_3$    $P_{44} = 0.022$  
   $P_{41} = 0.024$  
$\alpha$- quartz    $P_{44} = 0.0685$  
   $P_{41} = 0.041$ It is therefore possible to prepare a light deflector from single crystal $TeO_2$ utilizing its large photoelastic constant $P_{44}$. To this end, it is only required to cause acoustic shear waves conducted along the [001] direction and displaced to the (001) plane of said crystal, or those carried along the (001) plane and displaced to the [001] direction to interact abnormally with appropriately introduced light beams. It is easily expected that a light deflector of such construction will display a far higher interaction between the acoustic waves and light beams than the same kind of the conventional light deflector. (Reference : R. W. Dixon, IEEE Journal of Quantum Electronics; Vol. QE-3, 85, 1967).

Figure 2:
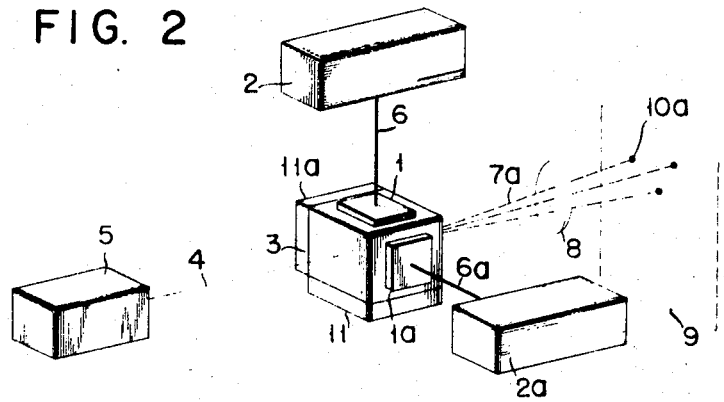
FIG. 2 is an explanatory perspective view of an arrangement for two-dimensional acousto-optical light deflection where there is used only one unit of single crystal paratellurite.

FIG. 2 illustrates a system so arranged as to permit two-dimensional light deflection based on the one-dimensional light deflecting arrangement of FIG. 1. According to the system of FIG. 2, acoustic shear waves are propagated through a single crystal medium along two equivalent [110] directions intersecting each other at right angles, and optical beams traveling substantially along the [001] direction are made to interact with said shear waves so as to be deflected in two dimensions. The numerals of FIG. 2 correspond to those of FIG. 1 and description thereof is omitted.

Figure 3:
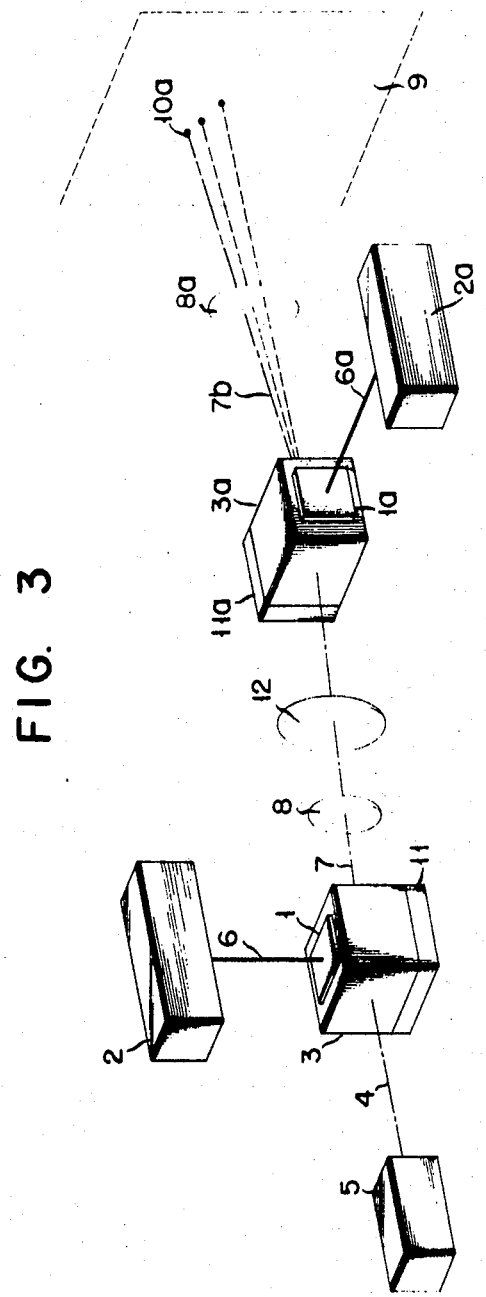
FIG. 3 is an explanatory perspective view of an arrangement for two-dimensional acousto-optical light deflection where there are used two units of single crystal paratellurite.

FIG. 3 shows another two-dimensional deflecting system modified from that of FIG. 2. The system of FIG. 3 includes two light deflecting media. Light beams deflected in a certain direction by a first deflecting medium are again deflected by a second deflecting medium in a direction perpendicular thereto. Where it is desired appropriately to rotate the polarization direction of light beams introduced into the first and second media, the object is attained by interposing between said first and second media suitable optical means for rotating the polarization plane such as a λ/2 plate 12. The numerals of FIG. 3 correspond to those of FIG. 2 and description thereof is omitted.

As illustrated in FIGS. 1, 2, and 3, a light deflector generally requires acoustic absorbers 11 and 11a so as to cause acoustic waves to be progressive through the medium. The conditions demanded of an appropriate material constituting the absorber are that the absorber has a mechanical impedance $\rho v$ approximately equal to that of the deflecting medium, and that acoustic loss occurring in the absorber is large.

The S-mode acoustic waves conducted along the [110] and [1.38, 1, 0] directions of the aforesaid single crystal $TeO_2$ have acoustic wave velocities of $0.617 \times 10^5$ cm/sec and $0.930 \times 10^5$ cm/sec respectively. These are exceptionally small values for a solid light deflecting medium. With light deflecting medium using such S-mode acoustic waves, metals such as Al, Pb, and Pb-Sn-Bi alloy (a soft solder of low melting point) listed in Table 3 display unduly large $\rho v$ values, and conversely, organic compounds such as epoxy resin and electron wax present very small $\rho v$ values. Accordingly, both groups of materials fail to be used as an absorber. In contract, chalcogenide glasses such as arsenic selenide glass and arsenic sulfide glass are relatively well matched in impedance with the aforesaid S-mode acoustic waves propagated through the $TeO_2$ medium, and moreover cause an appreciably large acoustic loss, so that such chalcogenide glasses are well adapted for use as an absorber.

The rate at which the acoustic energy of shear waves conducted along the [110] direction is transmitted from the light deflecting medium to the absorber is 96 percent for $As_2Se_3$ glass and 95 percent for $As_2S_3$ glass. Therefore, these chalcogenide glasses fully serve the purpose as an absorber. In the case of shear waves propagated along the [1.38, 1, 0] direction, there is realized good impedance matching, that is, substantially all acoustic waves are transmitted to the absorber.

TABLE 3. *Characteristics of absorbing substances for acoustic shear wave*

| Substance | Density | Acoustic shear waves | | Mechanical impedance $\rho v$ ($\times 10^5$ g/cm² sec) |
|---|---|---|---|---|
| | | Propagating direction | Velocity $v$ ($\times 10^5$ cm/sec) | |
| $TeO_2$ | 5.99 | [110] | 0.617 | 3.70 |
| | | [1.38, 1, 0] | 0.930 | 5.57 |
| $As_2Se_3$ glass | 4.6 | | 1.20 | 5.52 |
| $As_2S_3$ glass | 3.2 | | 1.80 | 5.76 |
| Al | 2.7 | | 3.08 | 8.3 |
| Pb | 11.4 | | 0.70 | 8.0 |
| Pb-Sn-Bi | 9.95 | | 1.06 | 10.5 |
| Epoxy resin | 1.05 | | 0.8 | 0.8 |
| Electron wax | 0.9 | | 1.0 | 0.9 |

As mentioned above, use of single crystal tellurium oxide as a light deflecting medium according to the present invention enables the formation of a light deflector displaying more excellent properties than the prior art device over a wide wavelength range of from visible to infrared rays. Those prominent characteristics are derived from the optically excellent quality of single crystal $TeO_2$, the readiness of $TeO_2$ to be prepared in the form of a single crystal, the freedom of said crystal from optical damage and its stable quality.

The aforementioned principle of using single crystal $TeO_2$ as a light deflecting medium and causing optical beams to interact with ultrasonic waves conducted through said medium will be applicable not only to a light deflector but also to an optical modulator or an optical correlator with the same excellent effect as in the light deflector.

What we claim is:

1. An arrangement for acousto-optical light deflection comprising a light deflecting medium of single crystal tellurium dioxide; means for propagating ultrasonic waves through said medium in an appropriate direction; and means for transmitting light beams through said medium so as to cause the light beams to interact with the ultrasonic waves elasto-optically in said medium.

2. An arrangement for acousto-optical light deflection comprising a light deflecting medium of single crystal tellurium dioxide; means for propagating ultrasonic waves through said medium in an appropriate direction; means for transmitting light beams through said medium so as to cause the light beams to interact with the ultrasonic waves elasto-optically in said medium; and means for absorbing acoustic waves transmitted from the medium.

3. An arrangement as defined in claim 1 wherein the single crystal tellurium dioxide medium has a volume of at least 10 × 10 × 10 mm.

4. An arrangement as defined in claim 1 wherein the effective optical wavelength ranges from 0.35 to 5 μm.

5. An arrangement as defined in claim 1 wherein the ultrasonic waves propagated through the medium have wavelengths of from VHF to UHF.

6. An arrangement for acousto-optical light deflection comprising a light deflecting medium of single crystal tellurium dioxide; means for propagating longitudinal ultrasonic waves through said medium substantially along a [001] direction; means for transmitting light beams through said medium substantially in a (001) plane to be polarized along the [001] direction by elasto-optical interaction with said ultrasonic waves in said medium; and means for absorbing the acoustic waves transmitted from said medium.

7. An arrangement as defined in claim 3 wherein the light beams are polarized along a ⊥ [001] direction.

8. An arrangement for acousto-optical light deflection comprising a light deflecting medium of single crystal tellurium dioxide; means for propagating longitudinal ultrasonic waves through said medium substantially along a [101] direction; means for transmitting light beams through medium substantially along a [$\overline{1}$01] direction to be polarized along a [010] direction by elasto-optical interaction with the ultrasonic waves in said medium; and means for absorbing acoustic waves transmitted from said medium.

9. An arrangement for acousto-optical light deflection comprising a medium of single crystal tellurium dioxide; means for propagating longitudinal ultrasonic waves through said medium substantially along the [100] direction; means for transmitting light beams through said medium substantially along a [$0\overline{1}1$] direction by elasto-optical interaction with the ultrasonic waves in said medium; and means for absorbing acoustic waves transmitted from said medium.

10. An arrangement for acousto-optical light deflection comprising a light deflecting medium of single crystal tellurium dioxide; means for propagating ultrasonic shear waves through said medium substantially along the [110] direction to be displaced to the [$\overline{1}10$] direction; means for transmitting light beams through said medium substantially along the [001] direction to be polarized in arbitrary directions by elasto-optical interaction with said ultrasonic waves in said medium; and means for absorbing acoustic waves transmitted from said medium.

11. An arrangement as defined in claim 10 wherein the means for absorbing acoustic waves transmitted from said medium comprises a chalcogenide glass selected from the group consisting of arsenic selenide glass and arsenic sulfide glass.

12. An arrangement for two-dimensional acousto-optical light deflection comprising a light deflecting medium of single crystal tellurium dioxide; two means for propagating ultrasonic shear waves through said medium along two equivalent [110] directions respectively intersecting each other at right angles; means for transmitting light beams through said medium substantially along the [001] direction by elasto-optical interaction with said ultrasonic waves in said medium; and means for absorbing acoustic waves transmitted from said medium.

13. An arrangement as defined in claim 12 wherein the means for absorbing acoustic wave transmitted from said medium comprises a chalcogenide glass selected from the group consisting of arsenic selenide glass and arsenic sulfide glass.

14. An arrangement for acousto-optical light deflection comprising a light deflecting medium of single crystal tellurium dioxide; means for propagating ultrasonic shear waves through said medium substantially along the [101] direction to be displaced to the [$\overline{1}01$] orientation; means for transmitting light beams through said medium substantially along the [010] direction to be polarized along the [100] orientation by elasto-optical interaction with ultrasonic shear waves in said medium; and means for absorbing acoustic waves transmitted from said medium.

15. An arrangement for acousto-optical light deflection comprising a light deflecting medium of single crystal tellurium dioxide; means for propagating ultrasonic shear waves through said medium along a direction determined by a zero temperature coefficient of the acoustic velocity to be displaced to the (001) plane; means for transmitting light beams through said medium along the [001] direction to be polarized in arbitrary directions by elasto-optical interaction with said ultrasonic shear waves in said medium; and means for absorbing acoustic waves transmitted from said medium.

16. An arrangement as defined in claim 15 wherein the ultrasonic shear waves are propagated along the [1.38, 1, 0] direction.

17. An arrangement as defined in claim 15 wherein the ultrasonic shear waves are propagated along the [1, 1.38, 0] direction.

18. An arrangement as defined in claim 15 wherein the ultrasonic shear waves are propagated along the [$\overline{1.38}$, 1, 0] direction.

19. An arrangement as defined in claim 15 wherein the ultrasonic shear are propagated along the [$\overline{1}$. 1.38, 0] direction.

20. An arrangement for acousto-optical light deflection comprising a light deflecting medium of single crystal tellurium dioxide; means for conducting ultrasonic shear waves through said medium in the (001) plane to be displaced to the [001] orientation; means for transmitting light beams through said medium so as to interact with said ultrasonic shear waves by the abnormal Bragg's reflection in said medium; and means for absorbing acoustic waves transmitted from said medium.

21. An arrangement for acousto-optical light deflection comprising a light deflecting medium of single crystal tellurium dioxide; means for conducting ultrasonic shear waves through said medium along the [001] orientation to be displaced to the (001) plane; means for transmitting light beams through said medium so as to interact with said ultrasonic shear waves by the abnormal Bragg's reflection in said medium; and means for absorbing acoustic waves transmitted from said medium.

22. An arrangement for two-dimensional acousto-optical light deflection comprising two deflecting media of single crystal tellurium dioxide; means for propagating ultrasonic waves through each medium in an appropriate direction; means for transmitting light beams through said two media in series so as to cause the light beams to interact with the ultrasonic waves elasto-optically in said media respectively, wherein the light beams deflected in a certain direction by the first deflecting medium are again deflected by the second deflecting medium in a direction perpendicular thereto.

23. An arrangement fro two-dimensional acousto-optical light deflection comprising two deflecting media of single crystal tellurium dioxide; means for propagating ultrasonic waves through each medium in an appropriate direction; optical means for rotating a polarization plane placed between the two deflecting media; means for transmitting light beams through said two media and the optical means therebetween in series so as to cause the light beams to interact with the ultrasonic waves elasto-optically in said media respectively, wherein the light beams deflected in a certain direction by the first deflecting medium are again deflected by the second deflecting medium in an appropriately rotated polarization direction.

24. An arrangement as defined in claim 23 wherein the optical means for rotating a polarization plane to be placed between the two deflecting media is a μ/2 plate.

* * * * *